(12) United States Patent
Vanham et al.

(10) Patent No.: US 12,136,083 B2
(45) Date of Patent: Nov. 5, 2024

(54) OFFLINE INTERCEPTION-FREE INTERACTION WITH A CRYPTOCURRENCY NETWORK USING A NETWORK-DISABLED DEVICE

(71) Applicant: Ngrave.IO NV, Zonhoven (BE)

(72) Inventors: Edouard Vanham, Zonhoven (BE); Ruben Merre, Zonhoven (BE); Xavier Hendrickx, Zonhoven (BE); Jeroen Meybosch, Zonhoven (BE)

(73) Assignee: NGRAVE.IO NV, Zonhoven (BE)

( * ) Notice: Subject to any disclaimer, the term of this patent is extended or adjusted under 35 U.S.C. 154(b) by 1035 days.

(21) Appl. No.: 16/745,529

(22) Filed: Jan. 17, 2020

(65) Prior Publication Data
US 2020/0234285 A1   Jul. 23, 2020

(30) Foreign Application Priority Data
Jan. 21, 2019   (EP) .................................... 19152881

(51) Int. Cl.
| | | |
|---|---|---|
| *G06Q 20/40* | (2012.01) | |
| *G06Q 20/06* | (2012.01) | |
| *G06Q 20/36* | (2012.01) | |
| *G06Q 20/38* | (2012.01) | |
| *H04L 9/08* | (2006.01) | |
| *H04L 9/32* | (2006.01) | |

(52) U.S. Cl.
CPC ..... *G06Q 20/3674* (2013.01); *G06Q 20/0658* (2013.01); *G06Q 20/3825* (2013.01); *G06Q 20/3829* (2013.01); *H04L 9/0825* (2013.01); *H04L 9/3247* (2013.01)

(58) Field of Classification Search
CPC .... G06Q 20/3678; G06Q 10/08; G06Q 20/36; G06Q 20/40; G06Q 20/40145; G06F 21/32
See application file for complete search history.

(56) References Cited

U.S. PATENT DOCUMENTS

| | | | | |
|---|---|---|---|---|
| 5,785,181 | A * | 7/1998 | Quartararo, Jr. ........ | G06K 17/00 209/3.3 |
| 8,479,012 | B1 * | 7/2013 | Harris ..................... | G06F 21/32 382/116 |
| 9,767,318 | B1 * | 9/2017 | Dropps ................... | G06F 21/72 |
| 11,606,219 | B2 * | 3/2023 | Wright .................. | H04L 9/3239 |

(Continued)

FOREIGN PATENT DOCUMENTS

WO   WO-2020264435 A1 * 12/2020 ................ A61J 1/03

OTHER PUBLICATIONS

Antoine: "How to get an address from a private key on Bitcoin", Oct. 22, 2018, retrieved from the Internet.

*Primary Examiner* — Radu Andrei
*Assistant Examiner* — Nakia Leffall-Allen
(74) *Attorney, Agent, or Firm* — Cermak & McGowan LLP; Malcolm K. McGowan

(57) ABSTRACT

The invention relates to a method for the fully offline interception-free interaction with a cryptocurrency network using a network-disabled device, the method comprises: generating a by the cryptocurrency network acceptable cryptographic key pair on the network-disabled device, from one or more seeds; wherein one or more of the seeds used for the generation of a cryptographic key-pair, are generated using one or more environmental sensors, biometric sensors, or a combination thereof.

17 Claims, 5 Drawing Sheets

(56) References Cited

U.S. PATENT DOCUMENTS

| | | | | |
|---|---|---|---|---|
| 2006/0288233 A1* | 12/2006 | Kozlay | ............... | G07C 9/257 |
| | | | | 713/186 |
| 2013/0318354 A1* | 11/2013 | Entschew | ............ | H04L 9/3247 |
| | | | | 713/175 |
| 2013/0332353 A1* | 12/2013 | Aidasani | ........... | G06K 19/0718 |
| | | | | 705/41 |
| 2014/0289833 A1* | 9/2014 | Briceno | ............... | H04L 9/006 |
| | | | | 726/5 |
| 2014/0347265 A1* | 11/2014 | Aimone | ............. | A61B 5/6803 |
| | | | | 345/156 |
| 2015/0035643 A1* | 2/2015 | Kursun | .................. | G07C 9/32 |
| | | | | 340/5.82 |
| 2015/0046337 A1* | 2/2015 | Hu | ..................... | G06Q 20/36 |
| | | | | 705/41 |
| 2015/0186636 A1* | 7/2015 | Tharappel | ............ | G06F 21/32 |
| | | | | 726/8 |
| 2015/0310444 A1* | 10/2015 | Chen | .................. | G06Q 20/308 |
| | | | | 705/44 |
| 2015/0324789 A1* | 11/2015 | Dvorak | .............. | H04L 63/0861 |
| | | | | 705/67 |
| 2016/0005026 A1* | 1/2016 | Bouffioux | ....... | G06Q 20/40145 |
| | | | | 705/44 |
| 2016/0134599 A1* | 5/2016 | Ross | .................. | H04L 63/0815 |
| | | | | 713/168 |
| 2017/0228727 A1* | 8/2017 | Forzley | ............. | G06Q 20/3823 |
| 2017/0346851 A1* | 11/2017 | Drake | ................. | H04L 9/0838 |
| 2018/0039990 A1* | 2/2018 | Lindemann | ........... | G06V 40/19 |
| 2018/0083955 A1* | 3/2018 | Tuli | ................... | H04L 63/0861 |
| 2018/0198609 A1* | 7/2018 | Khan | ................. | H04L 9/3066 |
| 2018/0234413 A1* | 8/2018 | Watanabe | ............ | H04L 9/0869 |

* cited by examiner

OFFLINE INTERCEPTION-FREE INTERACTION WITH A CRYPTOCURRENCY NETWORK USING A NETWORK-DISABLED DEVICE

This application claims the benefit of European Application No. EP19152881.9 filed Jan. 21, 2020.

FIELD OF THE INVENTION

The present disclosure relates generally to virtual wallets used to store and execute transactions using cryptocurrency. More specifically, the present disclosure relates to a method for the fully offline interception-free interaction with a cryptocurrency network using a network-disabled device, which overcomes problems existing in the prior art and simplifies existing methodologies and provides enhanced security.

BACKGROUND

Many modern economies are based largely upon transactions involving currency. In recent years, electronic currency transactions have become increasingly prevalent. Most electronic transactions function using government supported currencies; however, several virtual currencies have surfaced in recent years which offer an alternative to government regulated currencies. Such virtual currencies are not issued by centralized authorities like the U.S. department of the treasury. Instead, virtual currencies are regulated by cryptographic methods which manage and control the currency; this method of regulation has given rise to the term cryptocurrency, which is commonly used to describe such cryptographically regulated currencies. The value of most cryptocurrencies is based entirely on their open market valuation. As cryptocurrencies gain more widespread acceptance as a medium of exchange for goods, their relative value also rises.

In recent years, many companies and organizations have been investing large amounts of time and money into developing new methods which facilitate the storage and exchange of cryptocurrencies. One particular cryptocurrency which was the first of its kind is Bitcoin. Upon its initial introduction, bitcoins had almost no value, as there was essentially no infrastructure for their exchange, and no merchants who were willing to accept the currency. Initially, bitcoins had to be exchanged exclusively peer to peer with negotiations between parties being the only determining factor in the amount of bitcoins to be exchanged. In recent years, bitcoins and other cryptocurrencies have become much more widely accepted among various different Internet based organizations and merchants. Bitcoins and other cryptocurrencies are typically stored in a wallet which is represented by a pair of keys. The public key is the wallet's public address and the private key is the wallet password, granting its bearer the ability to spend the cryptocurrencies contained in the wallet. There are many different ways in which these cryptocurrency wallets can be stored and accessed, such as on a hard drive, smartphone, or on an internet accessible server. Some people may choose to store their bitcoins themselves on computers, physical drives, smartphones, or other devices which they actually own. Unfortunately this does leave a person open to loss. If their hard drive or device is hacked, physically stolen, or destroyed, they can lose all of their bitcoins very easily. Some people password-protect their wallets for added security but viruses, keystroke loggers, and other malware leave such wallets unprotected as well.

In order to facilitate the exchange of bitcoins and other cryptocurrencies between peers and merchants, many virtual wallets have been introduced. Such virtual wallets typically store a user's cryptocurrencies on a secure server where they can be accessed. Virtual wallets attempt to do two primary things; one, make it very easy to pay for transactions via cryptocurrencies. And two, reduce the amount of risk in storing the cryptocurrencies. Most virtual wallets store all or part of the user's cryptocurrency balance on a server and the user's account is simply password protected or protected with two factor authentication.

This means that if the server is ever compromised, it is very easy for malevolent parties to steal any bitcoins that were stored on the server. It also means that if the user is accessing the virtual wallet from a device that has been compromised by virus or malware, transactions can be redirected by a malevolent party to an unintended recipient. These are very grave security flaws, which can be found in many of the commercially available virtual wallets.

Methods and systems for secure cryptocurrency key creation and transaction signing are known in the prior art:

For example U.S. Pat. Application Publication No. 2018/0198609 to Sher Khan published Jul. 12, 2018 and entitled "Biometric Security For Cryptographic System" discloses a method in which a physical network including physical nodes with actual physical substances and a logical network including logical nodes without actual substances are uniquely linked to expand public ledger technology, which secures P2P type communication on logical network, to physical network. The authenticated network includes a private key uniquely linked to a public key. The private key is generated by a key generator and an identification device having physical substance and included in an identification core.

This known method does not deal with the problem of allowing data to be signed with the secret private key without ever exposing this private key to the public, or to have data passed to the private key storage device without a physical connection, nor does it solve the problem of safe account creation in case you cannot trust the on-chip randomness generator.

Also known is the device from U.S. Pat. No. 2018 019 860 9 to Hiroshi Watanabe and Takeshi Hamamoto issued Feb. 2, 2013 and entitled "Authenticated Network". This disclosure relates to a method of storing data allowing a seed value for generating an encryption key to be retrieved. The method comprises obtaining, for each of a plurality of biological data sources, a respective set of biometric data from an authorised user. A respective biometric identifier is generated from each set of biometric data. The biometric identifiers are stored in a database. A plurality of seed portions are generated that are combinable using a function to generate the seed value. Each seed portion is stored in the database in association with a biometric identifier.

This known method, while useful in key creation, does not solve the problem of using the generated private key to sign transaction data without exposing said private key.

The present invention aims to resolve at least some of the problems and disadvantages mentioned above.

Without limiting the invention to cryptographic key pairs, the invention is well suited for long-term offline management of all sorts of cryptographic parameters.

SUMMARY OF THE INVENTION

In a first aspect, the invention relates to a method for the fully offline interception-free interaction with a cryptocurrency network using a network-disabled device, the method comprises: generating a by the cryptocurrency network acceptable cryptographic key pair on the network-disabled device, from one or more seeds, wherein the cryptographic key pair comprises a public key and a private key, wherein the private key is generated by transforming one or more seeds, using one or more functions, concatenations, or a combination thereof, and wherein the public key is generated from the private key using a digital signature algorithm or a variant thereof; and wirelessly transmitting a transaction signature request from a network-enabled device to the network-disabled device, the transaction signature request comprising a requested amount of cryptocurrency, a requested amount of cryptocurrency, a source address, a destination address, and metadata, wherein the transaction signature request is verified by a user on the network-disabled device, wherein upon successful verification, the transaction signature request is cryptographically signed by the network-disabled device using the private key, and wherein the fully signed transaction is wirelessly transmitted from the network-disabled device to the network-enabled device for broadcast to the cryptocurrency network; wherein one or more of the seeds used for the generation of a cryptographic key-pair, are generated using one or more environmental sensors, biometric sensors, or a combination thereof. By using a network-disabled device, to generate a by the cryptocurrency network acceptable cryptographic key pair from one or more seeds generated using one or more environmental sensors, biometric sensors, instead of using a pseudo random number generation algorithm executed on any network-enabled or network-disabled device, a third party is unable to intercept any part of the generated seed and is subsequently unable to gain access to the users cryptographic key pair. Moreover, by forestalling any connection with any network-enabled device, information can never be intercepted. Said methodology overcomes problems existing in the prior art and simplifies existing methodologies and provides enhanced security. Preferably, the fully signed transaction is wirelessly transmitted using a QR-code.

In a second aspect, the invention relates to the network-disabled device, wherein said network-disabled device is a network-disabled electronic device comprising a processor configured to perform the method for the fully offline interception-free interaction with a cryptocurrency network.

Preferred embodiments of the method are shown in any of the claims 2 to 11 and 14 to 19. Said embodiments relate to security problems existing in the prior art and the simplification of the existing methodologies. In particular, by giving the user a sense of security and by increasing the entropy of the generated seeds and key pairs.

In a third aspect, the invention relates to a software program configured to perform the method for the fully offline interception-free interaction with a cryptocurrency network.

DETAILED DESCRIPTION OF THE INVENTION

Figure 1:
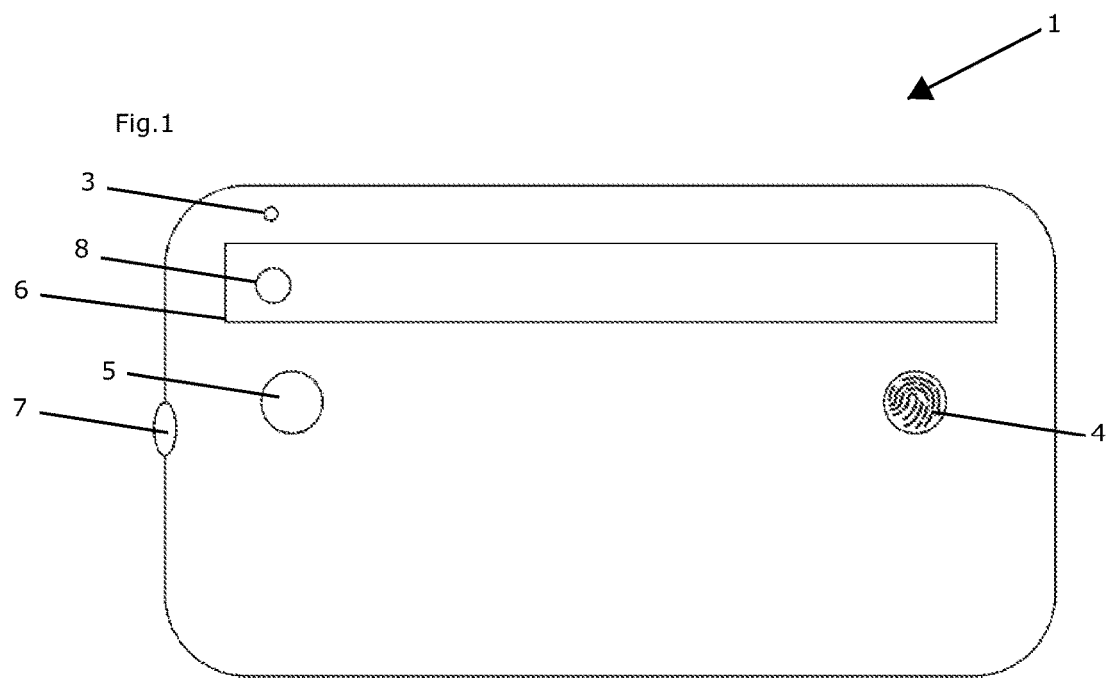
FIG. 1 shows the back view of an embodiment of the network-disabled electronic device, wherein the device comprises a light sensor as the environmental sensor, a camera sensor and a fingerprint reader as the biometric sensor.

The present disclosure addresses limitations known in the art, related to cryptocurrency transactions and safekeeping of cryptocurrency funds, including for example Bitcoin currency. The invention is however not limited to Bitcoin currency, as the invention can be adapted to the cryptographic operations specified by any cryptocurrency network. In particular, the present disclosure describes a method and a network-disabled electronic device usable for the fully offline interception-free interaction with a cryptocurrency network. This interaction includes, but is not limited to, the receiving and transmitting of funds, the storage of funds in a secure manner, etc. This interaction further includes the fully offline generation of a by the cryptocurrency network acceptable cryptographic key pair without fully relying on on-chip solutions.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

The term "network enabled" as used herein refers to a device (also referred to as a module) or system which communicates over network media using an open system transport and data protocol, for example the TCP/IP protocol over a variety of physical media, including but not limited to CSMA/CD (Carrier Sense Multiple Access LANs with Collision Detection) Ethernet IEEE 802.3, Wi-FI Wireless LAN IEEE 802.11, Wireless Personal Area Network IEEE 802.15, Broadband Wireless Access IEEE 802.16, Broadband, HomePlug® and HomePNA™ networks.

The term "network disabled" as used herein refers to a device (also referred to as a module) or system which is unable to communicate over conventional network media, including for example the TCP/IP protocol over a variety of physical media, further including for example but not limited to CSMA/CD (Carrier Sense Multiple Access LANs with Collision Detection) Ethernet IEEE 802.3, Wi-FI Wireless LAN IEEE 802.11, Wireless Personal Area Network IEEE 802.15, Broadband Wireless Access IEEE 802.16, Broadband, HomePlug® and HomePNA™ networks.

The term "communication medium" should be understood as comprising "computer-readable signal media" as well as a "human-readable media".

The term "computer-readable signal medium" may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A "computer-readable signal medium" may be any computer-readable medium that can communicate, propagate, or transport a program for use by or in connection with an instruction execution system, apparatus, or device. Program code embodied on a "computer-readable signal medium" may be transmitted using any appropriate medium, including but not limited to wireless, wireline, optical fiber cable, radio frequency (RF), or any suitable combination thereof.

The term "human-readable medium" should be understood as comprising any medium including a human readable portion that includes a string of random or non-random characters.

The term "seed" should be understood as a number or vector used to initialize a series of pseudo random numbers and increase the statistical randomness of the algorithm used, from this random number one or more private keys can be derived, to prevent the seed from being guessed, seeds need to be generated truly randomly and contain sufficient entropy. The problem of how to safely generate truly random keys is difficult, and has been addressed in many ways by various cryptographic systems.

The term "cryptocurrency network" refers to any decentralized system using a proof of work, proof of stake, or similar decision making methodology in order to determine consensus between participants in a decentralized network, with or without integrated economic incentives to provide computing power in order to run the decision making and consensus system.

The term "interaction with a cryptocurrency network" refers to the application of any cryptographic operations as specified by the corresponding cryptocurrency network, said interaction includes for example, but is not limited to, generating a by the cryptocurrency network acceptable cryptographic key pair and the cryptographical signing of a transaction signature request.

The term "ledger" refers to a decentralized ledger of information that is shared between participants in a cryptocurrency or other decentralized network. The term "ledger" may be used interchangeably with "cryptocurrency ledger", "public ledger", "decentralized cryptocurrency ledger" or "decentralized ledger".

The term "blockchain" refers to a distributed database that keeps a continuously growing list of data records. Each data record is protected against tampering and revisions. Blockchains are used with public ledgers of transactions, where the record is enforced cryptographically.

The term "participant" refers to any individual, business, or other entity that participates in a cryptocurrency network. The term "participant" may be used interchangeably with "network participant".

The term "third party" refers to any brokerage, exchange, or other entity with which a user intends to engage in activities, such activities include for example, but are not limited to, the exchange of cryptocurrency for traditional currency or vice versa, the cryptocurrency to cryptocurrency exchange using for example a digital currency exchange, the purchase of goods or services, or the payment of taxes.

The term "transaction" refers to a cryptocurrency transaction sent to or from a cryptocurrency address inside a cryptocurrency protocol. The term "transaction" may be used interchangeably with inputs and or outputs that form a transaction, a plurality of such inputs and or outputs, and scripts within the transaction, and or a plurality of such scripts.

The term "transaction signature request" refers to a cryptocurrency transaction, wherein said transaction has to be cryptographically signed using the respective private key.

The term "fully signed transaction" refers to a cryptocurrency transaction, wherein said transaction has been cryptographically signed using the respective private key.

The term "metadata" refers to data comprised within the script of a transaction, said data refers to data that is not comprised within the requested amount of cryptocurrency, the source address, or the destination address, metadata includes for example, but is not limited to, a hash of the contract, a means of identifying its location within the repository, or data required for smart contracts.

The term "smart contracts" refers to digital entities that define complex transaction logic and facilitate cross-organisational workflow including, but not limited to, storage of data, data access permissions, ordered workflow and computation. Digital entities that define complex transaction logic and facilitate cross-organisational workflow including, but not limited to, storage of data, data access permissions, ordered workflow and computation.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect, the invention relates to a method for the fully offline interception-free interaction with a cryptocurrency network using a network-disabled device, the method comprises: generating a by the cryptocurrency network acceptable cryptographic key pair on the network-disabled device, from one or more seeds, wherein the cryptographic key pair comprises a public key and a private key, wherein the private key is generated by transforming one or more seeds, using one or more functions, concatenations, or a combination thereof, and wherein the public key is generated from the private key using a digital signature algorithm or a variant thereof; and wirelessly transmitting a transaction signature request from a network-enabled device to the network-disabled device, the transaction signature request comprising a requested amount of cryptocurrency, a source address, a destination address, and metadata, wherein the transaction signature request is verified by a user on the network-disabled device, wherein upon successful verification, the transaction signature request is cryptographically signed by the network-disabled device using the private key, and wherein the fully signed transaction is wirelessly transmitted from the network-disabled device to the network-enabled device for broadcast to the cryptocurrency network; wherein one or more of the seeds used for the generation of a cryptographic key-pair, are generated using one or more environmental sensors, biometric sensors, or a combination thereof.

In a second aspect, the invention relates to the network-disabled device, wherein said network-disabled device is a network-disabled electronic device comprising a processor configured to perform the method for the fully offline interception-free interaction with a cryptocurrency network.

In a third aspect, the invention relates to a software program configured to perform the method for the fully offline interception-free interaction with a cryptocurrency network.

The present invention provides a method, a network-disabled electronic device, and a software program used for obtaining a seed value from one or more environmental sensors, biometric sensors, or a combination thereof. Said seed value is subsequently provided to a public-key algorithm of a cryptocurrency network, in order to generate an encryption key pair that is acceptable by said cryptocurrency network. Advantageously, the present invention provides a method, a network-disabled electronic device, and a software program for the repeatable generating of encryption key pairs. In a specific embodiment of the invention, after each generation of an encryption key pair, the device will store the generated private key in a hidden part of the software program. Whenever the user requires the private key, to for example perform a cryptographic operation, said key can still be retrieved from the hidden part in the software program. In a further specific embodiment of the invention, the private key can only be deleted if the user wants to delete both the private key and the public key from the device. Moreover, the deletion requires a very specific operation by the user. Said very specific operation is implemented, in order to avoid an accidental deletion of the private key.

Traditionally, cryptographic key pairs are generated using pseudo random number generation algorithms, said algorithms can be executed on a computer to generate a string of seemingly random numbers, and subsequently generate a predetermined sequence of numbers that is determined by a seed number. A party observing said seed would be able to predict the numbers to be generated. In fact, a portion of this sequence itself should be sufficient to guess the next numbers; computational difficulty is all that prevents this from occurring in a practical system.

By using a network-disabled device, to generate a by the cryptocurrency network acceptable cryptographic key pair from one or more seeds generated using one or more environmental sensors, biometric sensors, instead of using a pseudo random number generation algorithms executed on any network-enabled or network-disabled device, a third party is unable to intercept any part of the generated seed and is subsequently unable to gain access to the users cryptographic key pair.

The present invention also provides a digital currency transaction signature method for a digital currency transaction in a peer-to-peer network, using a network-disabled device. In a first step, a transaction signature request is established on a network-enabled device. In a second step, the method includes the subsequent wireless transmission of said transaction signature request from the network-enabled device to the network-disabled device, the transaction signature request comprises a requested amount of cryptocurrency, a source address, a destination address, and metadata, wherein the transaction signature request is verified by a user on the network-disabled device, wherein upon successful verification, the transaction signature request is cryptographically signed by the network-disabled device using the private key, and wherein the fully signed transaction is wirelessly transmitted from the network-disabled device to the network-enabled device for broadcast to the cryptocurrency network.

Implementing the disclosed method increases the security of the methods known in the prior-art for interaction with a cryptocurrency network. For virtual wallets running on general purpose computing devices, such as personal computers, servers, laptops, tablets, smartphones, and other similar devices, the systems are prone to attacks through any of the thousands or hundreds of thousands of communication ports open on those systems. Malicious software could be running in the background and capture all keystrokes, this capturing passwords or passcodes, or could create man-in-the-middle attacks by intercepting network packets. By forestalling any connection with any network-enabled device, information can never be intercepted.

In an embodiment of the invention, the network-disabled device comprises a tamper resistant enclosure, wherein said tamper resistant enclosure can detect tamper attacks or tamper attempts associated with memory and/or data stored in the network-disabled device, and wherein said tamper resistant enclosure reacts to the tamper attacks/attempts by providing evidence and/or by providing a response and/or by providing resistance to said tamper attacks/attempts. By providing a tamper resistant enclosure for the network-disabled device, protection is provided against supply chain attacks, wherein the network-disabled device can be intercepted and reprogrammed.

Mistakes during the wireless transfer are prevented, by prompting the user to confirm if the decoded data matches with the data displayed on the network-enabled device.

In a preferred embodiment of the invention, the step wherein the transaction signature request is cryptographically signed by the network-disabled device, further comprises a step wherein the signing of the transaction signature request requires user identification information.

The embedding of a user identification information system increases the security of the overall method by only allowing a user that possesses said identification information to sign any transactions.

In an embodiment of the invention, the signing of the transaction signature request requires user multi-factor identification information. In a further embodiment of the invention, multi-factor identification information is needed to unlock the network-disabled device.

The multi-factor identification scheme provides additional security for the user should he lose the network-disabled device. In an embodiment of the invention, the multi-factor identification information for the signing of the transaction signature request, requires fingerprint data (an inheritance factor) and/or a passcode (a knowledge factor) in addition to the device information itself (a possession factor).

In a preferred embodiment of the invention, the step wherein the transaction signature request is wirelessly transmitted from the network-enabled device to the network-disabled device, further comprises a step wherein the transaction signature request is wirelessly transmitted from the network-enabled device using a camera sensor on the network-disabled device.

In another embodiment of the invention, the user identification information is a PIN code. In a further embodiment of the invention, the user identification information is a biometric identifier registered using one or more biometric sensors, preferably a fingerprint reader is used. By using the readily-available biometric sensor, the user friendliness is improved, since the user does not has to remember his/hers PIN code.

In a preferred embodiment of the invention, the step wherein the fully signed transaction for broadcast to a cryptocurrency network is wirelessly transmitted from the network-disabled device to the network-enabled device, further comprises a step wherein the fully signed transaction is wirelessly transmitted by visualizing said fully signed transaction on the network-disabled device as at least one offline generated communication medium.

In a preferred embodiment of the invention, the step wherein the cryptographic key pair is generated from one or more seeds on the network-disabled device, further comprises a step wherein the generated cryptographic key pair is wirelessly transmitted from the network-disabled device to the network-enabled device and/or the user, by visualizing the public key and/or the private key on the network-disabled device as at least one offline generated communication medium.

By forestalling any connection with any network-enabled device, by using offline generated communication media, information can never be intercepted when transmitting the fully signed transaction from the network-disabled device to the network-enabled device.

In an embodiment of the invention, the offline generated communication medium comprises a combination of alpha-numeric characters.

In a preferred embodiment of the invention, at least one of the at least one offline generated communication media is a Quick Response (QR) code.

By using a QR code to transmit information between the network-disabled device and the network-enabled device, the user is provided with a user-friendly tool to transfer said information.

In an embodiment of the invention, the QR code with the generated information, is not simultaneously perceptible with the private key. Thereby preventing a third party to observe the private key trough the camera sensor used for scanning the QR code.

Traditionally, mobile phones or webcam cameras are used to scan QR codes. However, said systems are prone to attacks and malicious software could be running in the background and capture all data observed by the camera sensor, thus capturing passwords or passcodes, or parts of the private part of the cryptographic key pair. By designing a network-disabled device, to make both part of the cryptographic key pair not simultaneously perceptible, the interception through a camera sensor is forestalled.

In a preferred embodiment of the invention, the step wherein the cryptographic key pair is generated from one or more seeds on the network-disabled device, further comprises a step wherein the one or more seeds are generated at a by the user defined number of successive time points, and wherein at each of said successive time points, the cryptographic key pair is generated from the one or more seeds generated at said successive time point.

In an embodiment of the invention, the network-disabled device comprises a lock button, a light sensor as the environmental sensor, and a finger print reader as the biometric sensor. To start generating the seeds using this embodiment, the user has to perform a push manipulation, wherein said push manipulation requires the user to push both the fingerprint reader and the lock-button simultaneously. Said push manipulation triggers the environmental sensor and the biometric sensor to start collecting data over a by the user defined number of successive time points. In a further embodiment of the invention, the user defines the number of successive time points by pushing both the fingerprint reader and the lock-button simultaneously during a number of successive time points.

In an embodiment of the invention, the user has to manually transmit information between the network-disabled device and the network-enabled device. In a further embodiment of the invention, software is embedded in the network-disabled device, wherein said software converts the image file captured by the camera sensor, into a converted text file that includes text information, and positional information associating the text with the position of its representation in the image file. By embedding image-to-text converting software in the network-disabled device, no QR code generation is required on the network-enabled device and the user is still provided with a user-friendly tool to transmit information between the network-disabled device and the network-enabled device.

In a preferred embodiment of the invention, the method further comprises a step wherein the user is able to manually alter one or more randomized characters of the generated private key, wherein said manual alteration is randomized, and wherein the public key is generated from the manually altered private key.

Random number generators that utilize environmental measurements or biometric measurements to reduce the predictability of the sequence of random numbers, can for example use the pulses in a noise signal generated from a large resistor. Said pulses can be counted in a counter to provide a random number generator. However, these systems also have correlations that can be exploited to reduce the search list. By giving a user the possibility, to manually alter one or more characters of the generated private key, an additional security layer is implemented by adding additional randomness to the private key. To maximize said additional randomness, the user is not able to choose the one or more characters that are altered. As said characters are selected using a randomization algorithm. Moreover, the one or more manually altered characters are altered by generating a new private key. From said newly generated private key, a new character is derived, using a selection algorithm, a function, a concatenation, or a combination thereof, and said newly derived character is used to replace one of the selected characters. By limiting the human predictiveness, the entropy of the generated key-pair is in increased.

Additional randomness can also be introduced, by using multiple environmental sensors, biometric sensors, or combinations thereof, to generate one or more of the seeds. Moreover, the subsequent transformation of one or more seeds, using one or more functions, concatenations, or a combination thereof, adds an additional layer of randomness. By randomizing the different elements of the transformations, additional layers of randomization can also be introduced. Moreover, by giving a user control over the number of successive time points, wherein the one or more seeds are generated, an additional layer of randomness is added to the generated cryptographic key pair. Moreover, supply chain attacks are also prevented by the implementation of additional randomness layers. By allowing a certain degree of modification, the user also has an increased sense of security.

In an embodiment of the invention, the private key is generated in separate sets of characters, wherein each set of characters is generated using one or more seeds, generated using one or more environmental sensors, biometric sensors, or combinations thereof. In a further embodiment of the invention, the separate sets of characters is randomized in length. By implementing additional randomization features, the final entropy of the generated key pair is increased.

In a preferred embodiment of the invention, the private key and the public key are not simultaneously perceptible by the user.

Traditionally, transactions involving currency are performed in the vicinity of a desktop computer or other electronic devices equipped with camera sensors. However, said systems are prone to attacks and malicious software could be running in the background and capture all data observed by the camera sensor, thus capturing passwords or passcodes, or parts of the private part of the cryptographic key pair. By having a private key and a public key that are not simultaneously perceptible by the user, an additional layer of protection is provided to prevent the interception through a camera sensor of a desktop computer or any other electronic device equipped with a camera sensor.

In a preferred embodiment of the invention, one or more of the environmental sensors is selected from a list comprising: a temperature sensor (comprising: an ambient temperature sensor and a surface temperature sensor), a humidity sensor, a moisture sensor, a light sensor, an altitude sensor, an image capture device, an audio recorder, a sound level sensor, a wind speed sensor, a wind direction sensor, a pressure sensor, a shock sensor, an impact sensor, an environmental pressure sensor, an ionizing radiation sensor, an electric nose, an acceleration sensor, a speeds sensor, a location sensor, and a texture sensor, preferably a light sensor is used.

In a preferred embodiment of the invention, one or more of the biometric sensors is selected from a list comprising: a fingerprint reader, an iris scanner, a palm vein reader, a finger vein reader, a voice scan, and a facial recognition sensor, preferably a fingerprint reader is used.

By using an environmental sensor that measures one or more environmental and/or biometric quantities, a user is enabled to generate a cryptographic key pair at all times. Whereas the current condition of the measured quantities also adds another layer of randomness.

In one embodiment, the network-disabled device includes a first sensor for generating a first sequence of digital values representing measurements of a first environmental quantity, and a first compressor that provides a first sequence of compressed values often having a lower redundancy or internal correlation than the values of the first sequence of digital values compresses the sequence of digital values. The network-disabled device generates an output random number via a circuit for generating a random number from an input sequence of digital values, the input sequence being a function of one of the first sequences of compressed values.

In a further embodiment, the network-disabled device also includes a second sensor for generating a second sequence of digital values representing a measurement of a second environmental quantity, and a compressor for compressing that sequence. In this embodiment, a merge circuit for combining the first and second sequences of digital values to provide a merged sequence is also included. The random number generating circuit utilizes a digital value determined by the merged sequence. The merge circuit may include a third compressor for compressing the merged sequence to form a compressed merged sequence having a lower internal correlation than the merged sequence, the circuit for generating a random number utilizing the compressed merged sequence. In another embodiment of the present invention, the circuit for generating a random number includes a circuit for applying a hash function to a sequence of digital values that depends on the first sequence of compressed values. In another embodiment of the invention, an output blocking circuit prevents the random number generator from outputting a random number if the input sequence fails a predetermined test.

In a further embodiment, the network-disabled device includes a second sensor for generating a second sequence of digital values representing a measurement of a biometric quantity, and a compressor for compressing that sequence. In this embodiment, a merge circuit for combining the first and second sequences of digital values to provide a merged sequence is also included. The random number generating circuit utilizes a digital value determined by the merged sequence. The merge circuit may include a third compressor for compressing the merged sequence to form a compressed merged sequence having a lower internal correlation than the merged sequence, the circuit for generating a random number utilizing the compressed merged sequence.

In a preferred embodiment of the invention, the network-disabled electronic device has at least two zones, wherein said zones are not simultaneously perceptible, wherein the public key is visualized on at least one of said zones, and wherein the private key is visualized on at least one of the other zones.

Traditionally, cryptocurrency wallets are used in the vicinity of a desktop computer or other electronic devices equipped with camera sensors. However, said systems are prone to attacks and malicious software could be running in the background and capture all data observed by the camera sensor, thus capturing passwords or passcodes, or parts of the private part of the cryptographic key pair. By designing a network-disabled electronic device, wherein said device comprises at least two zones, that are not simultaneously perceptible, an additional layer of protection is provided to prevent the interception through a camera sensor of a desktop computer or any other electronic device equipped with a camera sensor.

In a preferred embodiment of the invention, the electronic device is in accordance with the ID-1-format of ISO/IEC 7810.

The ISO/IEC 7810 ID-1 standard is defined by the International Organization for Standardization (ISO) and the International Electrotechnical Commission (IEC) and is widely used for banking cards (credit cards, debit cards, ATM cards, etc.), driver's licenses and ID cards. The ISO/IEC 7810 ID-1 format specifies a size of 85.60 mm×53.98 mm. By using the widely accepted ID-1 format, a user can easily store the deconstructed substrate or parts of the deconstructed substrate in a secure location such as for example, however not limited to, a wallet or a card holder.

In an embodiment of the invention, the electronic device is in accordance with the ID-2-format of ISO/IEC 7810. In a further embodiment of the invention, the electronic device is in accordance with the ID-3-format of ISO/IEC 7810.

By using an easily portable format that is widely accepted, a user can easily store the electronic device in a secure location, preferably a portable secure location such as for example, however not limited to, a wallet or a card holder.

In an embodiment of the invention the electronic device is in accordance with the ID-000-format of ISO/IEC 7810. In a further embodiment of the invention, the electronic device is in accordance with the Mini-UICC format of ETSI TS 102 221 V9.0.0. In a further embodiment of the invention, the electronic device is in accordance with formats of ETSI TS 102 221 V11.0.0.

By using a format that is widely accepted, a user can easily store the electronic device in a secure location, for example, however not limited to, a SIM card slot or a memory card slot.

In an embodiment of the invention, the electronic device may conform to any standards or dimensional envelope. For example, one of the complementary units of the deconstructed substrate may conform to a future form factor standard provided by the International Standard Organization and/or the European Telecommunications Standards Institute. For example, one of the complementary units of the deconstructed substrate may have a height of between approximately 11.8 and 12 millimeters and width of between approximately 8.7 and 8.9 millimeters. In other examples, the height may be between about 10.9 and 11.1 millimeters and the width may be between about 8.9 and 9.7 millimeters. Further, in some examples, the fourth UICC 116 may have a thickness of between approximately 0.64 and 0.70 millimeters. In some examples, the UICC 116 may have a thickness of between approximately 0.68 and 0.84 millimeters.

As discussed hereabove, to prevent a seed from being guessed, seeds need to be generated truly randomly and contain sufficient entropy.

According to a preferred embodiment, at least one of the one or more seeds used for generating a cryptographic key-pair, is a random number or a random vector generated using a pseudorandom number generator. A random number or vector as the input for generating a cryptographic key-pair, has the advantage that a culprit is less likely to guess and/or intercept the initial conditions, e.g. a seed, of a cryptographic algorithm.

According to a preferred embodiment, at least one of the one or more seeds used for generating a cryptographic key-pair, is a true random number or a true random vector generated using one or more environmental sensors, biometric sensors or combinations thereof. Similarly, to a random number or vector, a true random number or vector used as the input for generating a cryptographic key-pair, has the advantage that a culprit is even more less likely to guess and/or intercept the initial conditions, e.g. seed, of a cryptographic algorithm.

In particular, using truly random and/or pseudorandom initial conditions for a cryptographic algorithm is especially advantageous, when said cryptographic algorithm can be considered a pseudorandom number generator, as knowing the initial conditions of such pseudorandom number generator would possibly allow a culprit to determine the generated private key of a key pair.

According to an especially preferred embodiment, the one or more seeds used in generating a cryptographic key-pair comprise a first seed and a second seed. Preferably, said first seed is a random number or a random vector generated using a pseudorandom number generator. Preferably, said second seed is a true random number or a true random vector generated using one or more environmental sensors, biometric sensors or combinations thereof. Such combination, would require a culprit to intercept at least two different initial conditions, generated using two different methodologies. Therefore, a culprit is even more less likely to guess and/or intercept the initial conditions, e.g. seed, of a cryptographic algorithm.

According to a further preferred embodiment, said first seed and said second seed are combined at a seed input ratio of the first seed to the second seed to obtain an input seed by using one or more functions, concatenations or combinations thereof. The private key of the cryptographic key-pair is generated by transforming said input seed as disclosed herein. Preferably, the seed input ratio is a ratio of a character length or a bit size of the first seed to a character length or a bit size of the second seed. Preferably, the first seed and the second seed are combined by concatenating a part of said first seed and a part of said second seed. A part within this context can be understood as an entire seed or any segment of said seed. Alternatively, the first seed and the second seed can be multiplied, divided, summated, etc.

Alternatively, parts of the first seed and the second seed can also be multiplied, divided, summated, etc.

According to a further preferred embodiment, the seed input ratio is at least 10:1 and at most 1:10, preferably at least 9:1 and at most 1:9, more preferably at least 8:1 and at most 1:8, more preferably at least 7:1 and at most 1:7, more preferably at least 6:1 and at most 1:6, more preferably at least 5:1 and at most 1:5, more preferably at least 5:1 and at most 1:5, more preferably at least 4:1 and at most 1:4, more preferably at least 3:1 and at most 1:3, more preferably at least 2:1 and at most 1:2. Ideally, the seed input ratio is about 1:1.

According to a further preferred embodiment, said first seed and said second seed are combined at said seed input ratio to form an input seed using a cryptographic hashing function. Preferably said cryptographic hashing function is one of: SHA-2, SHA-3, whirlpool, SHAKE256, bcrypt or blake2. Most preferably, said cryptographic hashing function is the SHA-256 cryptographic hashing function of the SHA-2 family.

According to a preferred embodiment, the user is able to alter a seed of the one or more seeds used in generating a cryptographic key-pair. The private key of the cryptographic key-pair is generated by transforming said altered seed using one or more functions, concatenations or combinations thereof. Preferably, said seed is altered by combining at least a part of said seed with a generated new seed using one or more functions, concatenations, or a combination thereof. Preferably, said new seed is generated using a pseudorandom number generator and/or environmental sensor, biometric sensor or any combination thereof. Alternatively, said new seed is preloaded in, for example, a memory circuit of the network-disabled device, however such methodology is undesirable as it allows easy interception and/or guessing of said seed.

According to a further preferred embodiment, altering said seed comprises the step of dividing said seed in two or more parts. Said seed can be divided randomly. Said seed can be divided in consecutive sections. Preferably, said seed is string of 64 hexadecimal characters and can be divided in eight parts. Altering said seed preferably further comprises the step of selecting at least one of the two or more parts. The selection can be preprogramed. The selection can be random. Preferably, the selection is done by a user. Altering said seed preferably further comprises the step of combining the selected parts using one or more functions, concatenations or any combinations thereof. Altering said seed preferably further comprises the step of generating a new seed. Altering said seed preferably further comprises the step of combining the combined selected parts and said new seed to form said altered seed using one or more functions, concatenations or combinations thereof. Altering said seed using the steps discussed hereabove, further increases entropy and unpredictability. Allowing a user to select parts of the divided seed, further increases entropy and unpredictability and also provides a feeling of security. According to a most preferred embodiment, a user is able to alter an input seed as used herein.

The new seed is disclosed hereabove can be generated using a pseudorandom number generator, environmental sensor, biometric sensor or any combinations thereof. Alternatively, said seed is preloaded in, for example, a memory circuit of the network-disabled device, however as discussed hereabove such seed is undesirable as it allows easy interception and/or guessing.

According to a preferred embodiment, at least one of the one or more seeds used for generating a cryptographic key-pair is a true random number or a true random vector generated using an image capture device. Image capturing devices are widely available and used. Preferably, the image capture device is used on a high noise setting. Preferably, two or more seeds used for generating a cryptographic key-pair are a true random number or a true random vector generated using the image capture device. Most preferably, three seeds used for generating a cryptographic key-pair are a true random number or a true random vector generated using the image capture device. Preferably, the user is provided with instruction to capture different objects, lighting, etc. using the image capture device.

According to a preferred embodiment, at least one of the one or more seeds used for generating a cryptographic key-pair is a true random number or a true random vector generated using a fingerprint reader. Finger print readers are widely available and used. Preferably, the fingerprint reader is used on a high noise setting.

According to an especially preferred embodiment, at least one seed, preferably three seeds, of the one or more seeds used for generating a cryptographic key-pair are a true random number or a true random vector generated using the image capture device and at least one seed, preferably one seed, of the one or more seeds used for generating a cryptographic key-pair is a true random number or a true random vector generated using a fingerprint reader. Preferably, the seeds generated using the image capture device and the seeds generated using a fingerprint reader are combined to obtain the second seed as discussed hereabove. The first seed as discussed hereabove is preferably a random number or a random vector generated using a pseudorandom number generator. More preferably, said first seed and said second seed are combined at a seed input ratio of the first seed to the second seed to obtain an input seed by using one or more functions, concatenations or combinations thereof. Most preferably, said seed input ratio is about 1:1. The inventors note that such methodology allows for the generation of a seed with a high unpredictability and entropy. Furthermore, such methodology is easy to use. The inventors note that after extended testing, users feel most comfortable when creating a key pair with the above methodology.

According to a preferred embodiment, the user identification information is a PIN code. According to a further preferred embodiment, the user identification information is at least in part a PIN code and at least in part a biometric identifier registered using the one or more biometric sensors, preferably whereby said biometric sensors comprise a fingerprint reader. By using the readily-available biometric sensor, the security of the multi-factor identification is improved, as the user requires a biometric identification in addition to the PIN code.

According to a further preferred embodiment, the user identification information is at least in part comprised by a device that can be connected to the network disabled device. Preferably, the user identification information is a key saved on the device. Herein, this device can be addressed as the physical key part. Upon connecting the physical key part to the network disabled device, the key is verified by the network disabled device. The security of the invention is further improved by requiring possession of such physical key part, as such physical key part is required in addition to other security measures, such as a PIN code. By requiring the physical key part, an additional possession factor is thus required and the multi-factor identification is further improved. Most preferably, the user identification information is at least in part a PIN code, at least in part a biometric identifier and at least in part a physical key part. Such multi-factor identification scheme proves most secure.

It shall be noted that any of the above embodiments can be combined or mixed.

EXAMPLES

The invention is further described by the following non-limiting examples which further illustrate the invention, and are not intended to, nor should they be interpreted to, limit the scope of the invention.

Example 1

Generating a Cryptographic Key Pair Using the Network-Disabled Device

Figure 2:
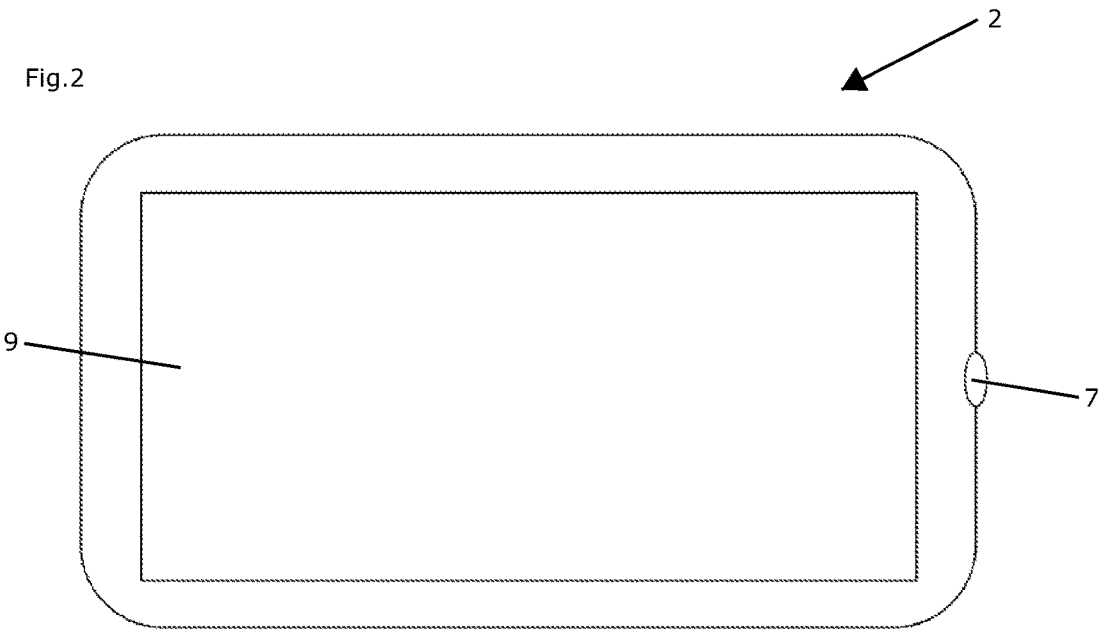
FIG. 2 shows the top view of an embodiment of the network-disabled electronic device, wherein the device comprises one display.

Within Example 1, the operation method for generating a cryptographic key pair is illustrated. Within this example, an embodiment of the network-disabled electronic device is used, wherein the lower side of the device comprises a light sensor as the environmental sensor, a camera sensor and a fingerprint reader as the biometric sensor, the upper side further comprises a first screen displaying the private key the upper side of the device comprises a second screen, displaying the public key and a variable output. This embodiment is illustrated in FIGS. 1 and 2.

Step 1

The Network-Disabled Electronic Device is Activated

After turning the network-disabled electronic device on, using the power switch, the device has to be activated. In order to activate the device, the user needs to push the fingerprint reader for 2 seconds. This push manipulation, triggers the light sensor and the fingerprint reader. This data is subsequently converted using one or more functions, concatenations, or combinations thereof, in order to obtain a hexadecimal character string of 64 characters. This string represents the private key of the cryptographic key pair. This process of measuring incoming light and translating it into a hexadecimal private key string occurs in near-real-time. The private key should visibly change on the first display of the network-disabled electronic device.

Step 2

Fixation of the Private Key+Public Key Generation

Subsequently, one or more seeds are generated at a by the user defined number of successive time points, and wherein at each of said successive time points, the cryptographic key pair is generated from the one or more seeds generated at said successive time point. The user defined number of successive time points are determined by the time that passes between the push manipulation performed by the user and the time wherein the user releases the lock-button. The release of the lock-button also directly triggers the cryptographic hashing of the public key on a second screen. Also a QR-code is generated at the same time, representing the public key.

An example of the first Generated private key:

Step 3

Private Key Manipulation

After pushing the lock-button in step 2, the user is able to manually alter one or more characters of the generated private key. This is indicated by a blinking randomly positioned first character in the private key. After each sequential random manipulation of the different randomly positioned characters of the private key, the public key is generated from said manually altered private key. This way, the user obtains control over the private key, and therefore a sense of security when it comes to the generation of the cryptographic key pair.

An example of the private key after 1 iteration:
E8413A4988017D988A337CD3834C401D2E94B7D707A42AB853E471201DB57BBF

Step 4

Locking a Modified Character

The user can, if desired, modify each of the private key characters in randomized matter. By pushing the lock-button a first randomized character can be saved, if the user is satisfied with this value. Subsequently, another randomized character will then start blinking and the user has the choice to save said character or to generate another randomized value, the latter being a modification of the character, that can be repeated at will. Note that there is no obligation to modify each and every character. However, as the number of randomized characters is increased, the level of randomness/entropy initially established by the light sensor also increases.

An example of the private key after 2 iterations:
E8412A4988017D988A337CD3834C401D2E94B7D707A42AB853E471201DB57BBF

Step 5

Saving the Final Cryptographic Key Pair

When the user is fully satisfied with the private key string, he can freeze the final private/public key pair by keeping pushed the lock-button for 2 seconds.

An example of the private key after 13 iterations:
E841DA49E8017D9C2A339CD3834C481D2B94877307A42AB853E4712015857865

After completing this step, the user has successfully and fully offline generated a random cryptographic key pair.

Example 2

Transferring Funds from the Secure Cryptographic Key Pair to the Public Key of a Third Party

Step 1

Creating a Transaction Signature Request

In a first step, a transaction is established and subsequently signed by the user on a network-enabled device, in order to generate a transaction signature request.

Step 2

Transmitting the Transaction Signature Request

Subsequently, the transaction signature request is wirelessly transmitted to the network-disabled device using a QR-code generated on a screen of the network-enabled device. This QR-code is scanned using the camera sensor on the network-disabled device. In a next step, a user is able to verify the data embedded in the scanned QR-code, in order to make no mistakes.

Step 3

Signing the Transaction Signature Request

After verifying the transaction signature request, a user is able to cryptographically sign the transaction signature request with the network-disabled device, using the private key stored therein.

Step 4

Transmitting the Fully Signed Transaction

The fully signed transaction is subsequently transmitted to the network-enabled device, using a QR-code generated on the network-disabled device. Said QR-code can be scanned using a camera sensor attached to the network-enabled device.

Example 3

Preferred Method of Creating an Input Seed

The method according to the current example can for example be executed on a processor comprised by the network-disabled device shown in FIGS. 7 to 12.

According to the current example, one seed is generated using a pseudorandom number generator preprogramed on the processor of the network disabled device. The pseudorandom number generator is set to generate 256-bit random data. In what follows, this one seed will be addressed as the "first seed".

According to the current example, three seeds of the one or more seeds used for generating a cryptographic key-pair are a true random number or a true random vector generated using the image capture device. To obtain said three seeds, three snapshots, i.e. digital images, are taken with the image capture device. According to the current example, one seed of the one or more seeds used for generating a cryptographic key-pair is a true random number or a true random vector generated using a fingerprint reader. To obtain said one seed, one snapshot, i.e. digital image, is taken with the fingerprint reader.

The seeds generated using the image capture device and the seeds generated using a fingerprint reader are combined to obtain one seed. In what follows, this one seed will be addressed as the "second seed".

According to the current example, both the first and second seed are combined at a seed input ratio of 1:1 using a cryptographic hashing function. Thus, an input seed is formed. Prior to combining the first and second seed, these seeds are converted to an appropriate input data format. The hashing function according to the current example is a SHA256 cryptographic hashing function of the SHA2 family, set to a fixed 256-bit data output.

Finally, the private key of the cryptographic key-pair is generated by transforming said input seed using the required functions and/or concatenations of the desired cryptocurrency network.

The inventors note that after extended testing, users feel most comfortable when creating a key pair with the above methodology.

The image capture device used herein is a camera (OVM7690) suited for mobile phones with a 640×480 pixel resolution. The camera is set to a high noise setting. The finger print reader used herein is a fingerprint area sensor module (NB-2034-S2) with 180×180 pixel resolution. The processor used herein is a Micro processing Unit (STM32MP157C).

Example 4

Alteration of a Seed

The method according to the current example can for example be executed on a processor comprised by the network-disabled device shown in FIGS. 7 to 12.

The current example pertains to a method for altering a seed. As a matter of illustration, the input seed generated in example 3 will be used as a starting point. However, it should be clear that the methodology disclosed in the current example is applicable to any seed described herein.

The generated input seed consists of 256-bit random data. This random data can be represented on the screen of the network-disabled device in a hexadecimal format. Thus, a string of 64 hexadecimal characters is shown to a user, which fall within the range of 0-9 and A-F. This string can be split in eight groups of eight characters each. Each of these groups can be addressed as "seed shuffling parts".

According to the current example, the user is able to select as many and whichever seed shuffling parts as he/she wants. The selected parts are combined using one or more functions, concatenations or combinations thereof. According to the current example, the selected parts are concatenated to a single string. In what follows, this single string will be addressed as the "old seed".

In a next step, a new seed is generated using a pseudorandom number generator and/or environmental sensor, biometric sensor or any combination thereof. Alternatively, said seed is preloaded in, for example, a memory circuit of the network-disabled device. According to the current example, said new seed is generated as a new input seed as disclosed in example 3. In what follows, said new seed will be addressed as the "new seed".

According to the current example, both the old and new seed are combined at a seed input ratio of 1:1 using a cryptographic hashing function. Thus, an input seed is formed. Prior to combining the old and new seed, these seeds are converted to an appropriate input data format. The hashing function according to the current example is a SHA256 cryptographic hashing function of the SHA2 family, set to a fixed 256-bit data output.

The inventors note after extensive research, that users feel comfortable when creating a key pair with the above methodology, as they have feeling of control. The methodology also further increases unpredictability and entropy of the key used in generating the key pair.

Example 5

Generating an Acceptable Cryptographic Key Pair

The method according to the current example can for example be executed on a processor comprised by the network-disabled device shown in FIGS. 7 to 12.

The user is able to generate a by a cryptocurrency network acceptable cryptographic key pair on the network-disabled device from one or more seeds. As a matter of illustration, the input seed generated in example 3 will be used as a starting point.

To create a key pair in accordance with the Bitcoin protocol Bitcoin Improvement Protocol 32 (bip-0032), the 256-bit input seed serves as the input for a one-way hash function HMAC-SHA512, which results in a 512-bit output. The left 256 bits are the 'Master Private Key', whereas the right 256 bits are the 'Master Chain Code'.

The public key will be derived from the Master Private Key according to the Elliptical Curve Digital Signature Algorithm (ECDSA) with curve secp256k1. As a result, a Master Private Key, a Master Public Key and a Master Chain Code are generated.

Furthermore, secure child keys can for example be generated according to the current invention, using the Bitcoin Improvement Protocol 44 (bip-0044).

DESCRIPTION OF FIGURES

The following description of the figures of specific embodiments of the invention is merely exemplary in nature and is not intended to limit the present teachings, their application or uses. Throughout the drawings, corresponding reference numerals indicate alike or corresponding parts and features.

FIG. 1 of the accompanying drawings illustrates a back view of an embodiment of the network-disabled electronic device, wherein the device comprises a light sensor 3 as the environmental sensor, a camera sensor 8 and a fingerprint reader 4 as the biometric sensor. The back view of the device corresponds with the back side 1 of the device. The device further comprises a first display 6, two physical buttons 5 and 7, one lock-button 5 and one power switch 7. The power switch 7 is used to turn on the device, whereas the lock-button 5 must be pushed during the push manipulation. During the push manipulation, both the fingerprint reader 4 and the lock-button 5 must be pushed in order to trigger the environmental sensor 3 and the biometric sensor 4 to start collecting data. Subsequently, a private key is generated and displayed on the first display 6. The device also allows for the manual manipulation of the generated private key. The different characters can be randomly selected using the lock-button 5, wherein after each selection the user can choose to lock the selected character using the lock-button 5 or generate a new character using the fingerprint reader 4 and/or the light sensor 3.

FIG. 2 of the accompanying drawings illustrates a top view of an embodiment of the network-disabled electronic device, wherein the device comprises a second display 9, that shows the public key 15 and also is a variable output display 10, 11, 12, 13, 14 and 15. The top view of the device corresponds with the top side 2 of the device.

Figure 3:
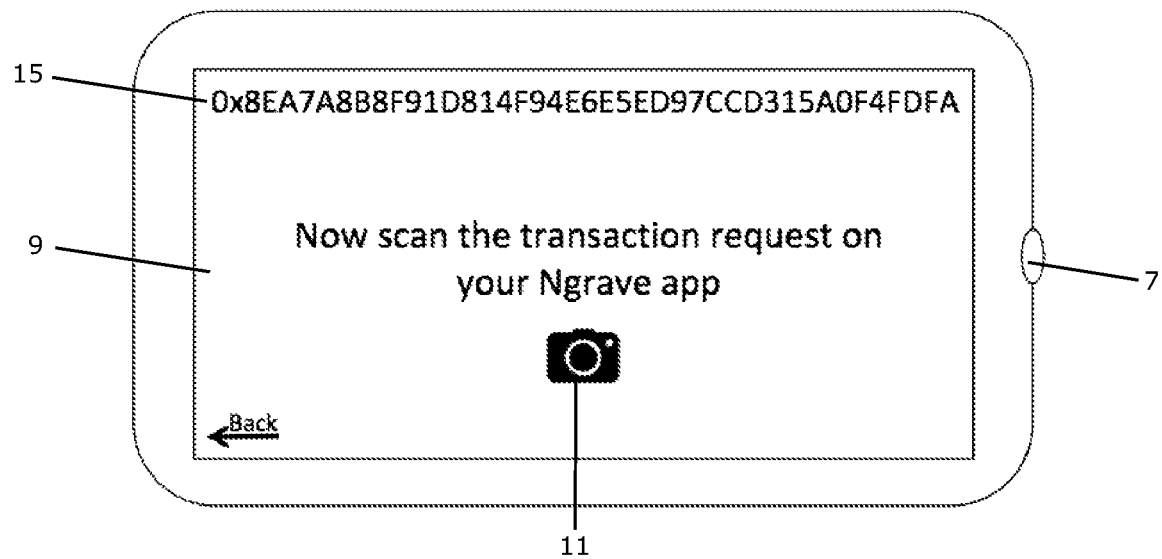
FIG. 3 shows the top view of the embodiment as illustrated in FIG. 2, wherein a user is instructed to transmit a transaction signature request from a network-enabled device using a camera sensor.
Figure 4:
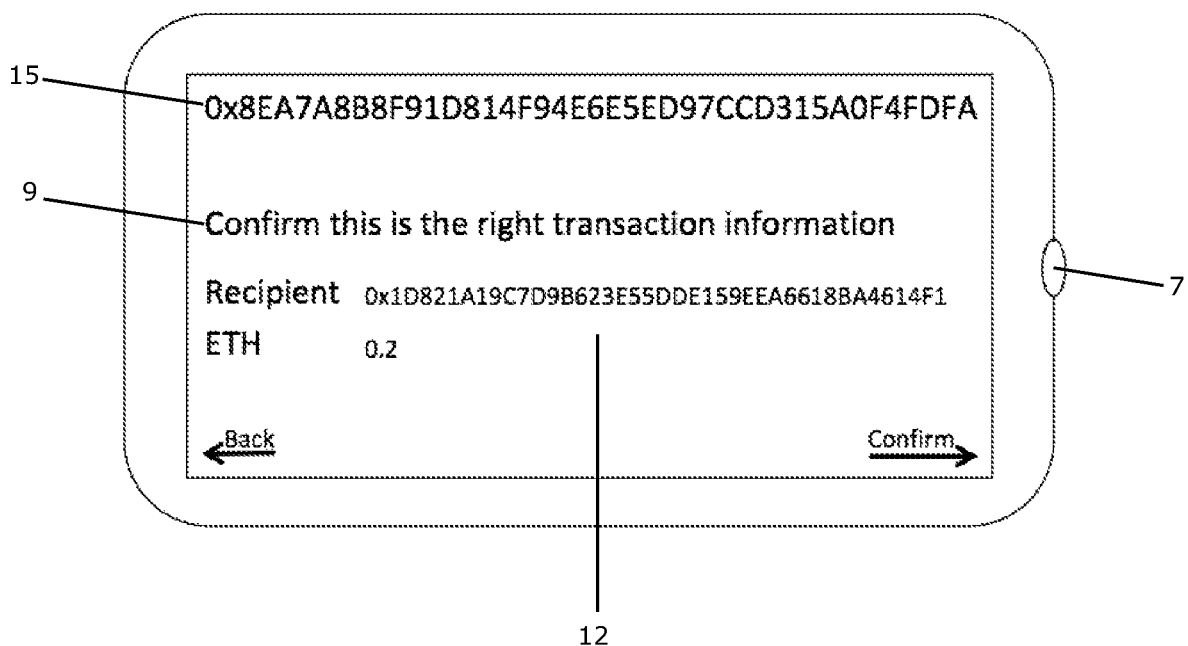
FIG. 4 shows the top view of the embodiment as illustrated in FIG. 2, wherein a user is instructed on the variable output display, to verify the transaction signature request information.
Figure 5:
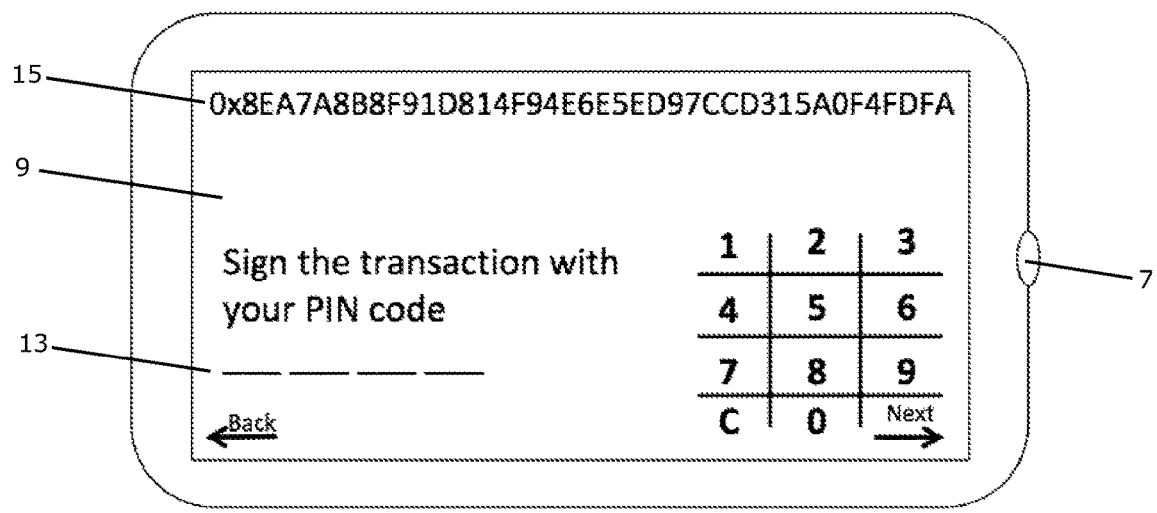
FIG. 5 shows the top view of the embodiment as illustrated in FIG. 2, wherein a user is instructed on the variable output display, to input his/hers user identification information.
Figure 6:
FIG. 6 shows the top view of the embodiment as illustrated in FIG. 2, wherein a user is instructed on the variable output display, to scan the QR code generated that comprises the fully signed transaction information.

FIGS. 3, 4, 5 and 6 of the accompanying drawings illustrate a top view of the embodiment of the network-disabled electronic device, wherein the device comprises the second display 9. FIG. 3 shows the embodiment as illustrated in FIG. 2, wherein a user is instructed on the variable output display 9 and 11, to transmit a transaction signature request from a network-enabled device using the camera sensor 8 on the back side 1 of the network-disabled electronic device. FIG. 4 shows the embodiment as illustrated in FIG. 2, wherein a user is instructed on the variable output display 9 and 12, to verify the transaction signature request information. FIG. 5 shows the embodiment as illustrated in FIG. 2, wherein a user is instructed on the variable output display 9 and 13, to input his/hers user identification information, and wherein this identification information is a PIN code. FIG. 6 shows the embodiment as illustrated in FIG. 2, wherein a user is instructed on the variable output display 9 and 14, to scan the QR code 10 generated that comprises the fully signed transaction information, using a camera sensor connected to the network-enabled device.

As illustrated by FIG. 1 and FIG. 2, the private key, shown on the first display 6, and the public key, shown on the second display 9, are not simultaneously perceptible by a user. Thereby preventing a third party to observe the private key trough the camera sensor used for scanning the QR code.

Figure 7:
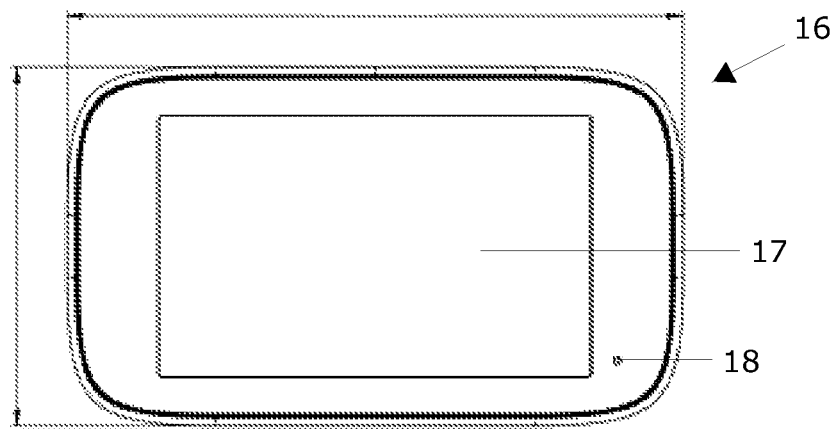
FIGS. 7 to 12 show a preferred embodiment of the network-disabled device.
Figure 8:
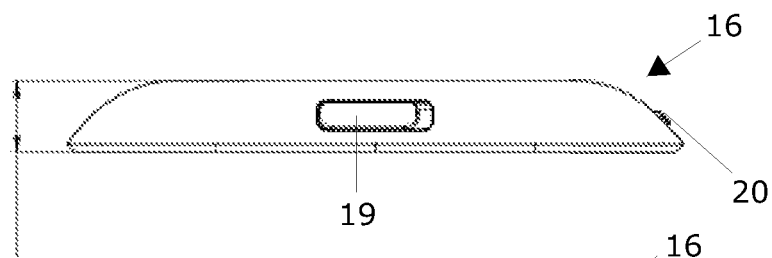
Figure 9:
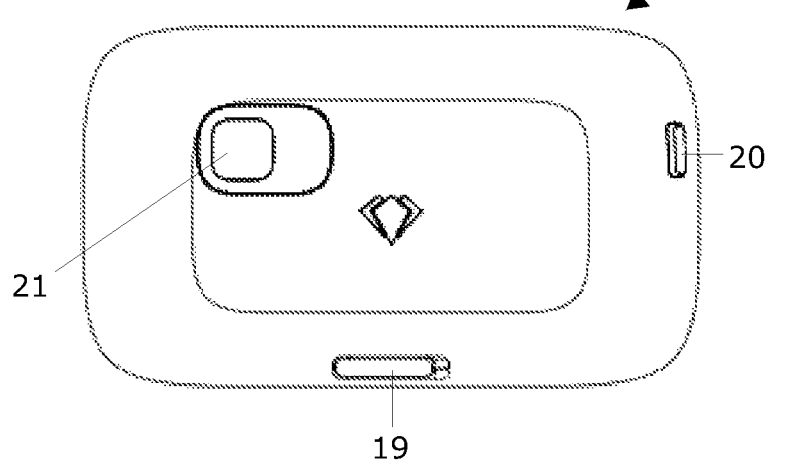
Figure 10:
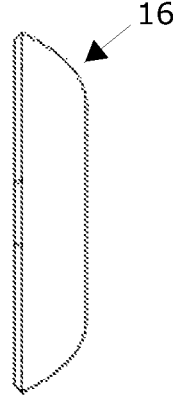
Figure 11:
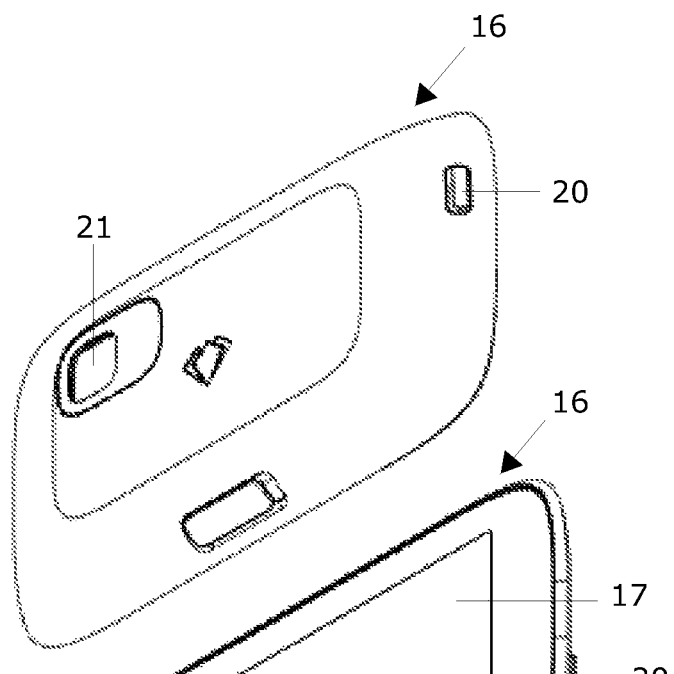
Figure 12:
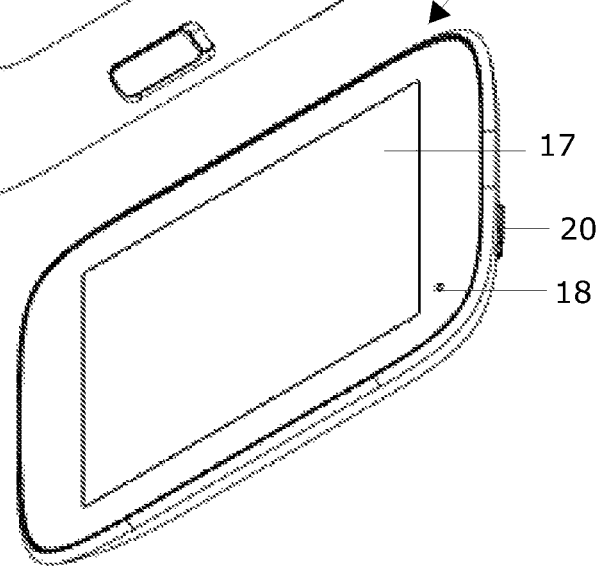

FIGS. 7 to 12 shown an embodiment of the network-disabled device 16 comprising a processor to perform instructions according to the current invention. FIG. 7 shows the front side of the device 16, comprising a display 17 and a microphone 18. FIG. 9 shows the back side of the device 16, comprising an image capturing device 21, a fingerprint reader 19 and a charging port 20. FIGS. 8 and 10 show a side view of the device 16. FIGS. 11 and 12 show a perspective view of the device 16. The device according to the current embodiment is able to generate a seed using the image capturing device 21, the fingerprint reader 19 and the microphone 18.

The present invention is in no way limited to the embodiments shown in the figures. On the contrary, methods according to the present invention may be realized in many different ways without departing from the scope of the invention.

The invention claimed is:

1. A method for the fully offline interception-free interaction with a cryptocurrency network using a network-disabled device, the method comprises:
    generating a cryptographic key pair on the network-disabled device, from one or more seeds, wherein the cryptographic key pair comprises a public key and a private key, wherein the private key is generated by transforming one or more seeds, using one or more functions, concatenations, or a combination thereof, and wherein the public key is generated from the private key using a digital signature algorithm or a variant thereof;
    wirelessly transmitting a transaction signature request from a network-enabled device to the network-disabled device, the transaction signature request comprising a requested amount of cryptocurrency, a source address, a destination address, and metadata, wherein the transaction signature request is verified by a user on the network-disabled device;
    cryptographically signing the transaction signature request by the network-disabled device using the private key, thereby creating a fully signed transaction; and
    wirelessly transmitting the fully signed transaction from the network-disabled device to the network-enabled device for broadcast to the cryptocurrency network;
    wherein one or more of the seeds used for the generation of a cryptographic key-pair, are generated using one or more environmental sensors and one or more biometric sensors;
    wherein the fully signed transaction is wirelessly transmitted by visualizing said fully signed transaction on the network-disabled device as at least one offline generated communication medium; and
    wherein at least one of the one or more seeds using for generating a cryptographic key pair is a true random number or a true random vector generated using the one or more environmental sensors and the one or more biometric sensors.

2. The method according to claim 1, wherein the transaction signature request is cryptographically signed by the network-disabled device, characterized in that the signing of the transaction signature request requires user identification information.

3. The method according to claim 1, wherein the transaction signature request is wirelessly transmitted from the network-enabled device to the network-disabled device, characterized in that the transaction signature request is wirelessly transmitted from the network-enabled device using a camera sensor on the network-disabled device.

4. The method according to claim 1, wherein the cryptographic key pair is generated from one or more seeds on the network-disabled device, characterized in that the generated cryptographic key pair is wirelessly transmitted from the network-disabled device to the network-enabled device and/or the user, by visualizing the public key and/or the private key on the network-disabled device as at least one offline generated communication medium.

5. The method according to claim 1, characterized in that at least one of the at least one offline generated communication media is a Quick Response (QR) code.

6. The method according to claim 1, wherein the cryptographic key pair is generated from one or more seeds on the network-disabled device, characterized in that the one or more seeds are generated at a by the user defined number of successive time points, and wherein at each of said successive time points, the cryptographic key pair is generated from the one or more seeds generated at said successive time point.

7. The method according to claim 1, characterized in that the user is able to manually alter one or more randomized characters of the generated private key, wherein said manual alteration is randomized, and wherein the public key is generated from the manually altered private key.

8. The method according to claim 1, characterized in that the private key and the public key are not simultaneously perceptible by the user.

9. The method according to claim 1, characterized in that the one or more of the environmental sensors is selected from a list comprising: a temperature sensor (comprising: an ambient temperature sensor and a surface temperature sensor), a humidity sensor, a moisture sensor, a light sensor, an image capture device, a sound level sensor, an electric nose, and an acceleration sensor.

10. The method according to claim 1, characterized in that the one or more of the biometric sensors is selected from a list comprising: a fingerprint reader, an iris scanner, a palm vein reader, a finger vein reader, a voice scan, and a facial recognition sensor.

11. A network-disabled device comprising a processor configured to perform the method of claim 1.

12. A software program configured to perform the method of claim 1 when executed on a processor of an electronic device.

13. The method according to claim 1, characterized in that at least one of the one or more seeds used for generating a cryptographic key-pair, is a random number or a random vector generated using a pseudorandom number generator.

14. The method according to claim 1, characterized in that the one or more seeds used in generating a cryptographic key-pair comprise a first seed and a second seed, whereby said first seed is a random number or a random vector generated using a pseudorandom number generator, whereby said second seed is a true random number or a true random vector generated using the one or more environmental sensors and the one or more biometric sensors, whereby said first seed and said second seed are combined at a seed input ratio of the first seed to the second seed to form an input seed using one or more functions, concatenations or combinations thereof, whereby the private key of the cryptographic key-pair is generated by transforming said input seed using one or more functions, concatenations or combinations thereof and whereby said seed input ratio is at least 10:1 and at most 1:10.

15. The method according to claim 14, characterized in that said first seed and said second seed are combined at said seed input ratio to form an input seed using a cryptographic hashing function, preferably one of: SHA-2, SHA-3, whirlpool, SHAKE256, bcrypt or blake2.

16. The method according to claim 1, characterized in that the user is able to alter a seed of the one or more seeds used in generating a cryptographic key-pair to form an altered seed, whereby the private key of the cryptographic key-pair is generated by transforming said altered seed using one or more functions, concatenations or combinations thereof and whereby altering said seed comprises the steps of: dividing said seed in two or more parts; selecting at least one of the two or more parts; combining the selected parts using one or more functions, concatenations or a combination thereof; generating a new seed; and combining the combined selected parts and said new seed to form said altered seed using one or more functions, concatenations or combinations thereof.

17. The method according to claim 1, characterized in that at least one of the one or more seeds used for generating a cryptographic key-pair is a true random number or a true random vector generated using an image capture device and whereby at least one of the one or more seeds used for generating a cryptographic key-pair is a true random number or a true random vector generated using a fingerprint reader.

* * * * *